US005633974A

United States Patent [19]

Chia

[11] Patent Number: 5,633,974

[45] Date of Patent: May 27, 1997

[54] ALL FIBER ATTENUATOR

[75] Inventor: Shin-Lo Chia, San Jose, Calif.

[73] Assignee: The Whitaker Corporation, Wilmington, Del.

[21] Appl. No.: 414,475

[22] Filed: Mar. 31, 1995

Related U.S. Application Data

[63] Continuation-in-part of Ser. No. 313,648, Sep. 27, 1994.

[51] Int. Cl.$^{6}$ .......... G02B 6/38

[52] U.S. Cl. .......... 385/140; 385/142; 385/96; 385/99

[58] Field of Search .......... 385/95, 96, 99, 385/140, 142

[56] References Cited

U.S. PATENT DOCUMENTS

| | | | |
|---|---|---|---|
| 4,529,262 | 7/1985 | Ashkin et al. | 350/96.15 |
| 4,639,078 | 1/1987 | Sheem | 350/96.21 |
| 4,728,170 | 3/1988 | Robertson | 350/96.15 |
| 4,799,946 | 1/1989 | Ainslie et al. | 65/3.12 |
| 4,881,793 | 11/1989 | Tarbox | 350/96.21 |
| 4,884,859 | 12/1989 | Yamamoto et al. | 350/96.15 |
| 4,925,514 | 5/1990 | Okada et al. | 156/249 |
| 5,095,519 | 3/1992 | Dorsey | 385/140 |
| 5,113,476 | 5/1992 | Okada et al. | 385/140 |
| 5,274,734 | 12/1993 | Jin et al. | 385/142 |

FOREIGN PATENT DOCUMENTS

| | | | |
|---|---|---|---|
| 57-4006 | 1/1982 | Japan | 385/140 |
| 62-275203 | 11/1987 | Japan | 385/140 |
| 5-88022 | 4/1993 | Japan | 385/140 |
| 05-88022 | 4/1993 | Japan | 385/140 |

OTHER PUBLICATIONS

*Journal of Lightwave Technology;* "Fabrication of High-Concentration Rare-Earth Doped Optical Fibers Using Chelates"; vol. 8; No. 11; Nov. 1990; pp. 1680–1683; Richard P. Tumminelli et al.

*Primary Examiner*—John Ngo

[57] ABSTRACT

An optical attenuator uses a segment of attenuating fiber interposed in the optical path. The attenuating fiber is produced by using a solution doping technique to introduce transition or rare earth elements into the fiber's core. The dopant reduces the transmission of the fiber. The degree of attenuation depends upon the material used as the dopant, the dopant level, and the length of the attenuation segment. In a specific embodiment, an optical attenuator is provided having a first and second signal carrying optical fibers and an attenuating fiber segment, each of which has a core, a cladding substantially coaxial with the core, and a substantially planar endface. The attenuating fiber segment is fusion spliced between the first and second signal carrying optical fibers. In a second embodiment a portion of the cladding of the attenuating fiber is chemically etched.

10 Claims, 5 Drawing Sheets

12 18 14 10 18 16

Fig. 1
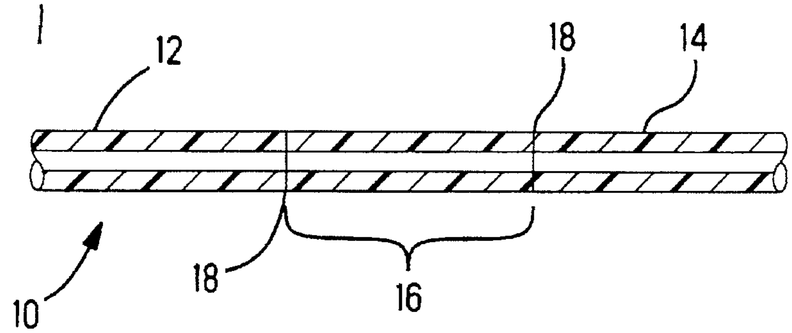
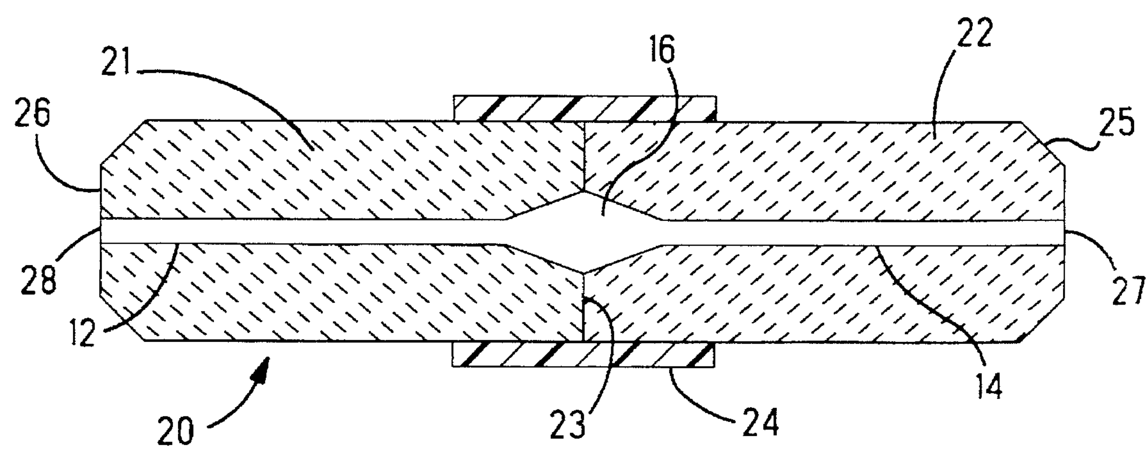
Fig. 2
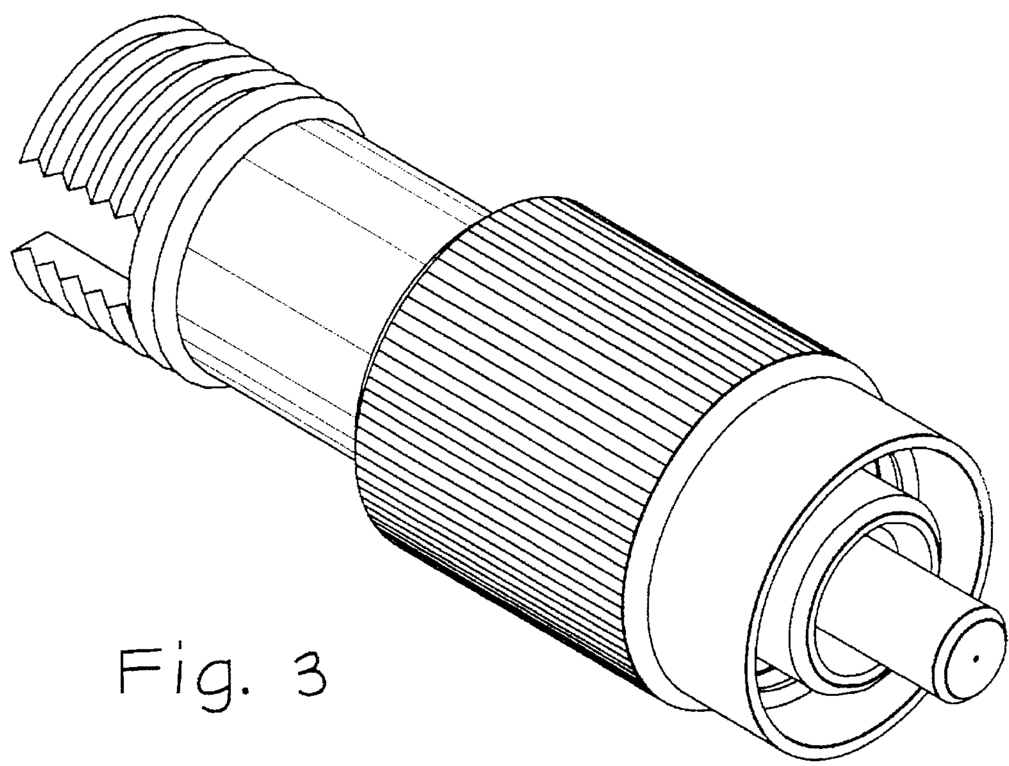
Fig. 3

ALL FIBER ATTENUATOR

BACKGROUND OF THE INVENTION

This application is a continuation-in-part of U.S. patent application, Ser. No. 08/313,648 filed Sep. 27, 1994 pending Nov. 5, 1996.

The present invention relates generally to fiber optic devices. Specifically, the present invention relates to an all fiber attenuator.

Although a primary virtue of optical fibers as communication media is the low loss of the fibers, there are instances where it is necessary to provide attenuation in the optical path. A variety of methods have been disclosed to fabricate optical fiber attenuators.

In U.S. Pat. No. 4,639,078 the end of a fiber is coated with a thin layer of an adhesive liquid containing submicron light absorbing particles. The liquid is spread evenly over the end of the fiber before it is cured. After solidification the coated end of the fiber is spliced to the end of a second fiber.

In U.S. Pat. No. 5,095,519 a section of coreless, undoped fiber is fusion spliced into an optical fiber transmission path, both fibers being of the same diameter. Upon encountering the insert the beam diameter expands to a pre-selected diameter at the end of the insert. The ratio of the beam diameter at the end of the insert to the diameter of the adjacent fiber end determines the degree of attenuation.

In U.S. Pat. No. 4,884,859 an optical attenuation segment within a fiber is created by forming fine cracks in the attenuating segment. The cracks are formed by heating a segment of the fiber and simultaneously applying tension to that segment.

In U.S. Pat. No. 4,529,262 a birefringent polarization-preserving fiber and a single polarization fiber are combined. The polarization-preserving fiber acts as a variable wave plate and the single-polarization fiber acts as a polarizer. The degree of attenuation can be modified by exposing the fiber to tension, pressure, or temperature, thereby altering the birefringence in the polarization-preserving fiber.

In U.S. Pat. No. 4,881,793 an attenuating fiber segment is spliced into a signal carrying fiber. The attenuating segment is formed by vapor doping a length of fiber and then cutting the fiber to an appropriate length to achieve the desired level of attenuation.

The above attenuators suffer from a number of performance disadvantages. For example, in the '859 patent the number and size of the cracks regulate the degree of attenuation, two factors which are difficult to precisely control. A second problem can be the environmental stability of the attenuator. In particular, the cracks in the '859 fibers and the polarization of the '262 polarization-preserving fibers are environmentally sensitive, thus increasing the costs associated with these attenuators as well as limiting their possible applications. Wavelength and polarization sensitivities of some of attenuators adds even further limitations to their use.

From the foregoing, it is apparent that an optical attenuator is desired which may be inexpensively produced and which may provide a precise attenuation of light energy over a broad range, and for different configurations.

SUMMARY OF THE INVENTION

The present invention provides an optical attenuator which is capable of being fabricated to provide any desired level of attenuation within a wide range of levels, and which is characterized by a high level of wavelength insensitivity.

In brief, an optical attenuator according to the present invention uses a segment of attenuating fiber interposed in the optical path. The attenuating fiber is produced by using a solution doping technique to introduce transition or rare earth elements into the fiber's core. The dopant reduces the transmission of the fiber by an amount that depends upon the material used as the dopant, the dopant level, and the length of the attenuation segment.

In a specific embodiment, an optical attenuator for in-line use comprises first and second signal-carrying optical fibers and an attenuating fiber segment, each of which has a core with a substantially coaxial cladding. Each of the first and second fibers is formed with at least one substantially planar endface. The attenuating fiber segment has both endfaces substantially flat. Prior to assembly the attenuating fiber segment is doped to provide a given level of attenuation. The attenuating fiber segment is then fusion spliced between the first and second signal carrying optical fibers.

In a second embodiment, the attenuator includes two ferrule assemblies. Within each ferrule assembly an optical fiber and one portion of an attenuating fiber are held in a fixed relationship such that the endfaces of the optical fiber and the attenuating fiber are in close optical proximity to one another and the fibers are substantially collinear. The two assemblies are held in a fixed relationship with respect to each other with an appropriately sized sleeve.

A further understanding of the nature and advantages of the present invention may be realized by reference to the remaining portions of the specification and the drawings.

BRIEF DESCRIPTION OF THE DRAWINGS

FIG. 1 is a representation of an optical attenuator assembly according to a particular embodiment of the present invention;

FIG. 2 is a representation of a ferrule assembly employed by a particular embodiment of the present invention;

FIG. 3 shows the present invention packaged for use with industry standard FC type optical fiber connectors;

DESCRIPTION OF THE PREFERRED EMBODIMENT

Figure 4:
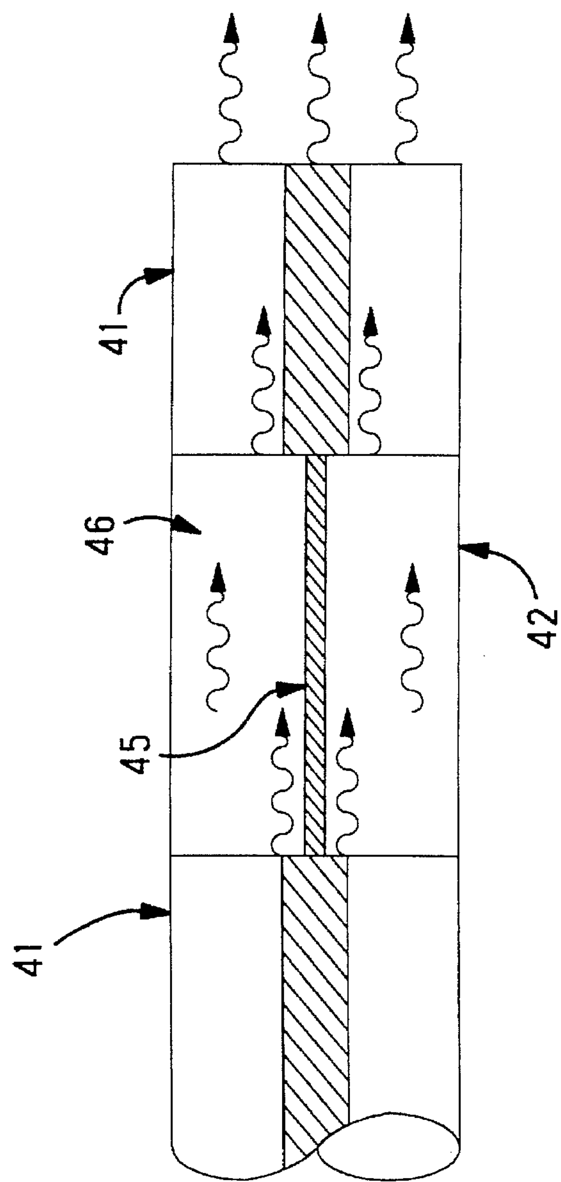
FIG. 4 illustrates an all fiber attenuator coupled directly to a detector.

FIG. 1 is a representation of the operative portion of an optical attenuator 10 designed according to an embodiment of the present invention. Attenuator 10 includes a first single-mode optical fiber 12 and a second single-mode optical fiber 14. Fusion spliced between fibers 12 and 14 is an attenuating optical fiber 16. The fusion splices are shown at points 18. In the preferred embodiment fibers 12, 14, and 16 each have a core and a cladding substantially coaxial with the core. Further, they are each of approximately equal diameter. The adjacent endfaces of fibers 12, 14, and 16 are substantially parallel and are spliced such that the core axes of the fibers are substantially collinear.

Attenuating fiber 16 is formed by solution doping a segment of optical fiber. The segment is preferably doped with either a rare earth or transition metal element. The level of attenuation is directly proportional to both dopant concentration and fiber segment length. It is also the case that the attenuation is dependant on the wavelength of the signal traveling in the fiber. While it is the case that the attenuation of radiation due to the core material absorption in the doped attenuation fiber is predetermined to be 1 dB/mm, and that it is in fact independent of the wavelength of the signal, the total attenuation value (that is absorption due to the doped attenuation fiber plus the attenuation due to the coupling of the attenuation fiber at the input and output fibers) is wavelength dependent because of differences in the field diameter of the modes in the fiber optic waveguide (isotropic core material). This is understood as follows. The total energy of the radiation of a given is distributed over the fiber cross-section. While the mode is supported in the input fiber 12, its mode field diameter extends beyond the diameter of the fiber core. When the guided wave reaches the attenuation fiber with its 6 micron diameter attenuation fiber 16, while the mode is still guided by the core, some of its energy is propgated in the non-absorbing cladding outside the absorbing core. Accordingly, the attenuation is dependent on the mode field diameter as well as the absorbtion coefficient of the doped core material of the attenuating fiber. For example, the invention utilizes Co as the preferred dopant for absorption material in the attenuation fiber 16. Commercially available single mode fiber creates a mode field diameter of approximately 9 microns at a mode wavelength of 1300 nm, and a mode field diameter of approximately 10 microns at a mode wavelength of 1550 nm. The result is that the larger mode field diameter will couple more of its energy to the 6 micron core diameter segment of attenuation fiber 16. To be clear, the total attenuation is the final overlap integral between the physical core size and the beam mode field diameter. Therefore, the larger mode field diameter (1550 nm wavelength mode) has less attenuation than the smaller mode field diameter beam. Finally, a similar analysis and result applies in an analysis of a two-joint fiber system as shown in FIG. 4.

Figure 6:
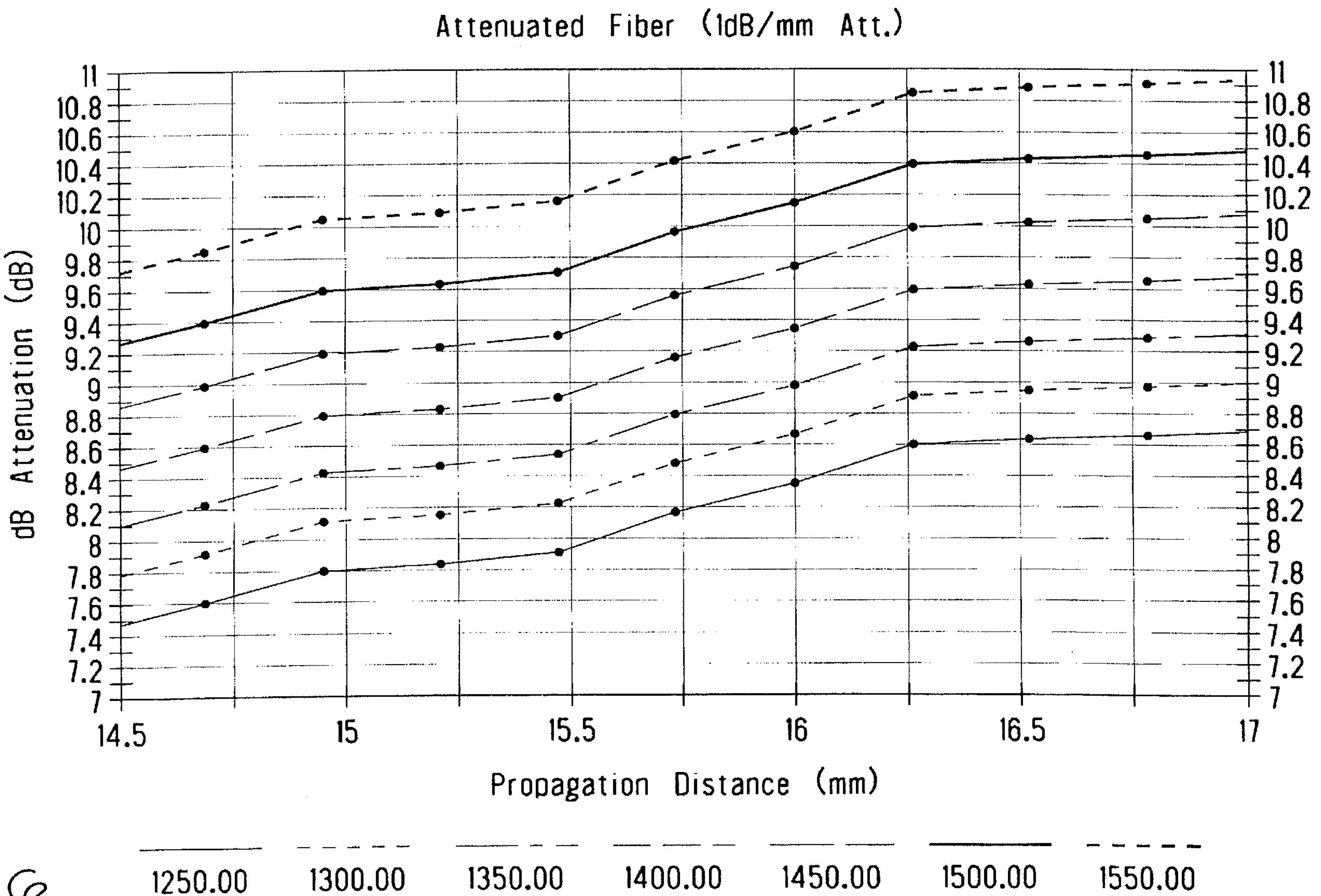
FIG. 6 is a graph showing the calculated attenuation versus distance in the attenuation fiber 16 for different wavelengths. FIG. *6a* is an isolated section of FIG. 6.
Figure 6A:
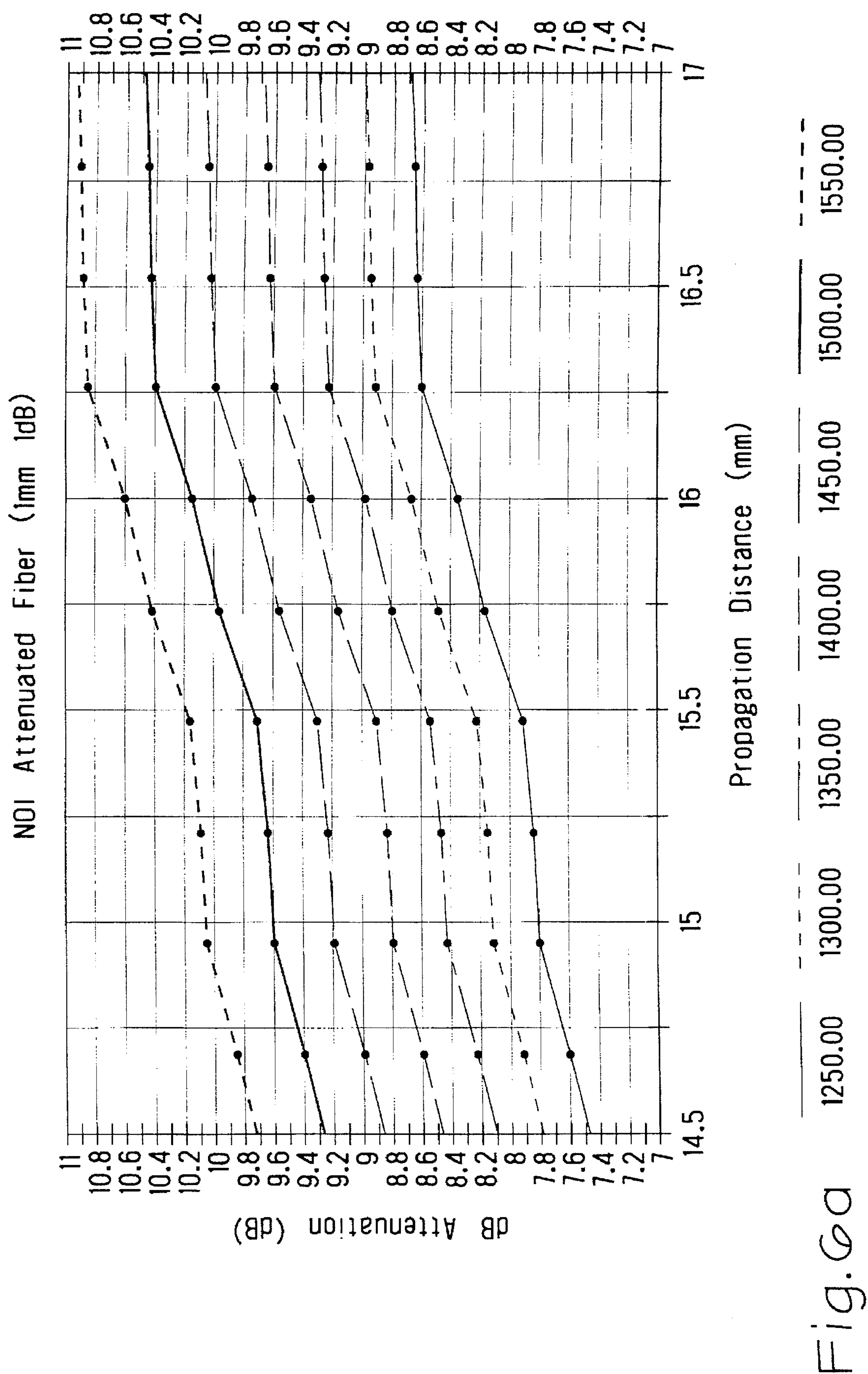
Figure 7:
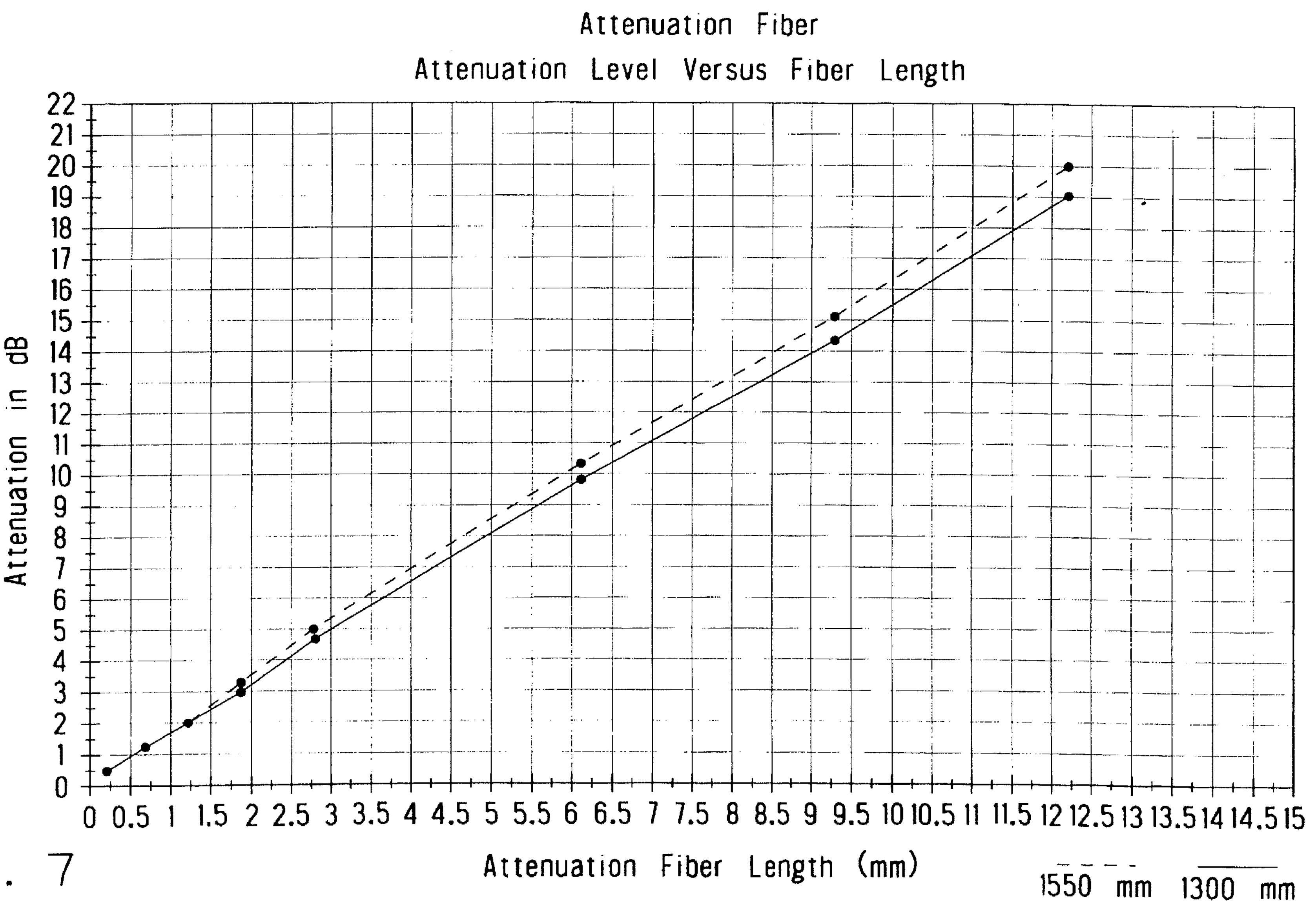
FIG. 7 is a graph that shows the exemplary experimental signal attenuation for various wavelengths of interest over a given distance of the fiber.

FIG. 6 shows the calculated attenuation versus distance in attenuation fiber 16 for different wavelengths. The distance 0.0 to 5.0 mm is the standard S.M. fiber. From 5.0 mm to 15.0 mm distance, a wavelength independent 1.0 dB attenuation in length for the attenuation fiber has been set. Then from 15.0 to 20.0 mm the standard S.M fiber is replicated. As can be seen from the graph, there appears to be approximately 2.0 dB attenuation decreasing loss with wavelength. This intrinsic wavelength dependency due to wavelength traveling in the two joint attenuation fiber system should be compensated by the material used as the core dopant. FIG. 7 shows typical experimental data for the attenuation fiber made by solution doping technique with Co as the preferred dopant for each different fiber length. This shows the increasing loss versus wavelength but with less than 1 dB attenuation differential between 1300 and 1550 nm wavelength range.

Vapor doping is the traditional method of incorporating dopants into optical fibers. As noted in the '793 patent discussed above, there are several different vapor deposition techniques including modified chemical vapor deposition (MCVD), outside vapor deposition (OVD), and vapor axial deposition (VAD). These techniques are used to form a thick rod called a precursor, the precursor having a suitable compositional cross section. After the precursor is formed it is drawn into a fiber with the desired composition gradients.

Solution doping offers an alternative approach to introducing a dopant into an optical fiber. This technique allows much higher dopant concentrations to be achieved, especially with rare earths which are difficult to utilize in the vapor deposition techniques. U.S. Pat. No. 4,799,946, incorporated herein by reference, discloses doping optical fibers using this method.

FIG. 2 illustrates the all fiber attenuator in an assembly 20. Assembly 20 includes two ferrule assemblies 21 and 22 having central bores which contain optical fibers 12 and 14, respectively. Attenuating fiber segment 16 is located between fibers 12 and 14. The adjoining fiber endfaces for fiber pairs 12/16 and 14/16 may either be placed in substantial optical contact with one another or fusion spliced prior to assembly within assembly 20. Ferrule assemblies 21 and 22 are held together in a fixed relationship at an interface 23 inside an alignment sleeve 24, assembly 20 having mating faces 25 and 26 for optically mating fiber endfaces 27 and 28 to other optical assemblies (not shown). Sleeve 24 may be a split sleeve exerting radial pressure on both ferrules, thereby centering and aligning them. The assembly can be inserted into a variety of package formats such as SC, ST, or FC type connectors. FIG. 3 shows the assembly packaged for use with an industry standard FC type optical fiber connector.

Optical fibers 12 and 14 may be either single-mode or multi-mode fibers. A single-mode fiber typically has a core diameter of 8.3–10 μm, a cladding diameter of 125 μm, and a buffer diameter of 250, 500, or 900 μm. Single-mode fibers typically operate at wavelengths between 1200 and 1600 nm. Multi-mode fibers with cladding diameters of 125 μm are available with core diameters of 50, 62, and 100 μm. Multi-mode fibers are also available with a core diameter of 100 μm and a cladding diameter of 140 μm. Multi-mode fibers typically operate at wavelengths between 700 and 1600 nm.

Figure 5:
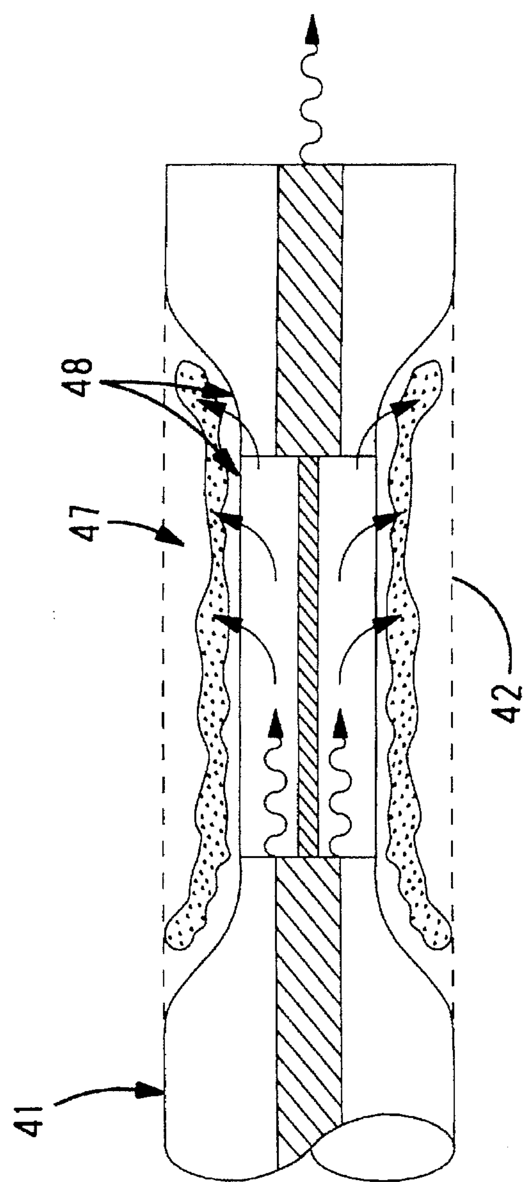
FIG. 5 illustrates an all fiber attenuator as shown in FIG. 4 with the attenuating fiber having an etched outer cladding.

FIG. 4 illustrates the two joint attenuation scheme of the present invention. As is shown a single-mode optical fiber 41 is fusion spliced to an attenuating optical fiber 42. Attenuation, as in the above embodiment, is provided by solution doping the core of a segment of an optical fiber. Attenuating fiber 42 is thereafter similarly joined to a second single-mode fiber 41. In this configuration light which is not absorbed by the dopant will instead be scattered out of a core portion 45 and into a cladding portion 46 of attenuating fiber 42. If left untreated this light, referred to as leakage light and appropriately shown as such can traverse the joint to the second fiber section and emerge as shown as cladding light. This can have adverse affects in cases where it is undesireable, for example if the light from the attenuator is impingent on a detector 44. The leakage light can impinge on the detector 44 thus decreasing the level of attenuation provided by attenuating fiber 42. This ill-effect can be reduced by etching the cladding portion of the fiber as shown in FIG. 5. In this figure a cladding portion 47 of attenuating fiber 42 has been etched preferably by standard chemical techniques. In this instance most of the light which has been scattered into cladding portion 47 will not be reflected by the etched and roughened fiber walls 48. Instead this light will be leaked out of the fiber, thus not reaching the detector and not significantly affecting the performance of the fiber attenuator.

While the invention has been particularly shown and described with reference to specific embodiments thereof, it will be understood by those skilled in the art that the foregoing and other changes in the form and details may be made therein without departing from the spirit or scope of the invention.

I claim:

1. An optical attenuator, comprising a first optical fiber and a second optical fiber; and a solution doped optical fiber disposed between said first optical fiber and said second optical fiber and connected to said first optical fiber and said second optical fiber, said solution doped optical fiber being an attenuating optical fiber.

2. An optical attenuator as recited in claim 1 wherein said solution doped optical fiber is doped with Co.

3. An optical attenuator as recited in claim 2 wherein said solution doped optical fiber effects attenuation of light in the wavelength range of 1250 to 1550 nm.

4. An optical attenuator as recited in claim 1, wherein said solution doped optical fiber has a selectively etched cladding portion concentrically about said fiber.

5. An optical attenuator, comprising a first optical fiber fusion spliced to a first end of a solution doped attenuating optical fiber and a second optical fiber fusion spliced to a second end of a solution doped optical fiber, said solution doped optical fiber attenuating light in the wavelength range of 1250–1550 nm.

6. An optical attenuator as recited in claim 5 in said solution doped attenuating optical fiber has a selectively etched cladding.

7. An optical attenuator, comprising a first optical fiber having a front surface, a solution doped attenuating optical fiber having a first end and a second end, said first end being attached to said first surface of said first optical fiber in said second end being attached to a front surface of a second optical fiber, said solution doped optical fiber having a selectively etched cladding.

8. An optical attenuator as recited in claim 7, wherein light of a wavelength in the range of 1250–1550 nm is attenuated by said solution doped optical fiber.

9. An optical attenuator comprising a first optical fiber and a second optical fiber; and a solution doped cobalt solution doped optical fiber disposed between said first and said second optical fiber and connected to said first and said second optical fiber, said Co solution doped optical fiber being an attenuating optical fiber.

10. An optical attenuator as recited in claim 9 wherein said Co solution doped optical fiber has a selectively etched cladding portion concentrically about said fiber.

* * * * *